(12) United States Patent
Kamitani (10) Patent No.: US 8,000,196 B2
(45) Date of Patent: Aug. 16, 2011

(54) COMPOSITE REPRODUCING APPARATUS

(75) Inventor: Tsuyoshi Kamitani, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 358 days.

(21) Appl. No.: 12/222,942

(22) Filed: Aug. 20, 2008

(65) Prior Publication Data
US 2009/0052291 A1     Feb. 26, 2009

(30) Foreign Application Priority Data
Aug. 21, 2007   (JP) ................. 2007-215230

(51) Int. Cl.
*G11B 5/58*   (2006.01)
(52) U.S. Cl. .................................. 369/53.22
(58) Field of Classification Search .............. None
See application file for complete search history.

(56) References Cited

U.S. PATENT DOCUMENTS

| | | | |
|---|---|---|---|
| 6,430,121 B1 * | 8/2002 | Shiraishi et al. | 369/30.28 |
| 6,646,651 B1 * | 11/2003 | Katsura et al. | 345/593 |
| 2002/0175924 A1 * | 11/2002 | Yui et al. | 345/660 |
| 2003/0020757 A1 * | 1/2003 | Aratani et al. | 345/790 |
| 2007/0174067 A1 * | 7/2007 | Ito et al. | 705/1 |

FOREIGN PATENT DOCUMENTS

| | | |
|---|---|---|
| JP | 2005-346893 | 12/2005 |
| JP | 2006-268990 | 10/2006 |

* cited by examiner

*Primary Examiner* — Daniell L Negron
*Assistant Examiner* — Huy Nguyen
(74) *Attorney, Agent, or Firm* — Morgan, Lewis & Bockius LLP (57) ABSTRACT

An optical disc reproducing device that composes a composite reproducing apparatus in accordance with the present invention includes an optical disc detecting portion which detects inserting and ejecting of an optical disc. The optical disc reproducing device also includes an identification information obtaining portion which obtains identification information to uniquely identify the optical disc from a management information recorded area of the optical disc. The identification information obtaining portion reads out the identification information and outputs it to a display device when inserting of the optical disc is detected by the optical disc detecting portion. An identification information recording portion which is included in the display device stores the identification information in a memory portion when the identification information is output from the optical disc reproducing device. Then an identification information display portion reads out the identification information and displays it on a display portion when it receives a command to display the identification information.

4 Claims, 6 Drawing Sheets

COMPOSITE REPRODUCING APPARATUS

This application is based on Japanese Patent Application No. 2007-215230 filed on Aug. 21, 2007, and the contents of which are hereby incorporated by reference.

BACKGROUND OF THE INVENTION

1. Field of the Invention

The present invention relates to an composite reproducing apparatus which is composed of an optical disc reproducing device that reproduces image recorded in an optical disc and a display device, and the present invention particularly relates to a composite reproducing apparatus which can display information with regard to an optical disc on the display device even in a state where the optical disc reproducing device stops its operation.

2. Description of Related Art

Recently a digital reproducing device such as a Digital Versatile Disc (DVD) player and a Blu-ray Disc (BD) player widely spreads as apparatus to reproduce a motion picture and sound which are processed in an image display device such as a television. Further a composite reproducing apparatus composed of the reproducing device and the display device such as the television device widely spread.

Representative examples of the composite reproducing apparatus are, for example, a television with a built-in HDD recorder, a television with a built-in DVD player and the like. These composite apparatuses usually have a common power supply which supplies power to the respective devices which are included in the composite apparatus, however, operation of each device can be individually controlled. If the apparatus is for example the television with a built-in DVD player, the DVD player portion and the television device portion can be independently operated. And they individually have as a result a plurality of power buttons for example. Consequently, in case where only a part of the device portions is used, operation of the other device is stopped so that it can save power consumption.

With regard to the above description JP-A-2006-268990 discloses an optical disc system displaying existence of an optical disc in an optical disc reproducing device by On-Screen Display (OSD) of a television receiver so that a user can easily see the existence. This disc system detects existence of an optical disc in a main body of the device. Then the device generates a DiscIn displaying signal as a signal to show existence of an optical disc, and outputs the DiscIn displaying signal to the television receiver. When the television receiver receives the DiscIn displaying signal, the television receiver displays a DiscIn image by the OSD as an image to show the existence of an optical disc.

Further, with regard to the above description JP-A-2005-346893 discloses a reproducing apparatus easily finding where a desired music is recorded in a plurality of recording media. When a music guiding information of the desired music is input, this reproducing device judges whether there is a medium in which a music data file that agrees with the input music guiding information is recorded among all the recording media which are inserted on the device. In case where there is a matched medium, the device informs a user the recording medium identifying information of the matched recording medium.

However the devices disclosed in JP-A-2006-268990 and JP-A-2005-346893 have to read out the information then display it, both of the disc reproducing device and the television device accordingly have to be operated. In the composite reproducing apparatus, the disc reproducing device is usually stopped when the disc reproducing device is not used, for example, when a television broadcast is viewed. In such a state, there is a problem that a user must turn on the optical disc reproducing device and wait till a process of spinup has been completed and reading out of the disc becomes possible when the user wants to confirm information of the optical disc that is placed on the disc reproducing device.

SUMMARY OF THE INVENTION

The present invention is made in view of the above described problem and it is an object of the present invention to provide a composite reproducing apparatus including an optical disc reproducing device, the apparatus being able to rapidly inform information with regard to the optical disc that is placed even in case where the optical disc reproducing device is stopped.

To attain the above described object a composite reproducing apparatus in accordance with the present invention includes: a display device which comprises a memory portion, a display portion, and a video signal superposing portion that performs superposition of video signals; and an optical disc reproducing device which comprises an optical disc drive, the apparatus being able to control start and stop of the display device and the optical disc reproducing device respectively, the apparatus is characterized in that the optical disc reproducing device further comprises: an optical disc detecting portion which detects inserting and ejecting of the optical disc on/from the optical disc drive; and an identification information obtaining portion which obtains identification information to identify the optical disc from a management information recorded area of the optical disc and outputs it to the display device when inserting of the optical disc is detected by the optical disc detecting portion, and the display device further comprises: an identification information recording portion which stores the identification information that is output from the identification information obtaining portion in the memory portion; and an identification information display portion which reads out the identification information from the memory portion when the identification information display portion receives a command to display the identification information, and sends a video signal including the identification information that is superposed by the video signal superposing portion to the display portion.

And the composite reproducing apparatus in accordance with the present invention consequently is a composite reproducing apparatus which is composed of a display device such as a television device and an optical disc reproducing device such as a DVD player. The display device includes at least a memory portion such as memory, a display portion such as a monitor, and an OSD processing portion (video signal superposing portion) which generates a video signal to perform OSD on a display portion and superposes the video signal. Further, the optical disc reproducing device includes at least an optical disc drive. It should be noted that the display device and the optical disc reproducing device individually include control portions, and the respective devices can independently operate as a result.

Further, the optical disc reproducing device includes an optical disc detecting portion which detects inserting and ejecting of the optical disc. Further, the optical disc reproducing device includes an identification information obtaining portion which obtains identification information to uniquely identify the optical disc from a management information recorded area of the optical disc where file system and the like are recorded. The identification information obtaining portion reads out the identification information and outputs it to the display device when inserting of the optical disc is detected by the optical disc detecting portion.

Further, the display device includes an identification information recording portion and an identification information display portion. The identification information recording portion stores the identification information in the memory portion such as memory when the identification information is output from the optical disc reproducing device. The identification information display portion reads out the identification information from the memory portion when it receives a command to display the identification information. Then the identification information display portion lets the OSD processing portion superpose video signal to display the read out identification information and displays it on the display portion.

Further, to attain the above described object the composite reproducing apparatus in accordance with the present invention is characterized in that the display device further comprises an identification information erasing portion which erases the identification information that is stored in the memory portion when ejecting of the optical disc is detected by the optical disc detecting portion.

The display device consequently includes the identification information erasing portion in the composite reproducing apparatus in accordance with the present invention. The identification information erasing portion waits for notice of detected ejecting which is output when the optical disc detecting portion detects ejecting of the optical disc. Then, the identification information erasing portion erases the identification information which is stored in the memory portion when the notice of detected ejecting is received. And it is possible to prevent as a result an incorrect identification information from being displayed in a state where the optical disc is not placed on the device.

Further, to attain the above described object the composite reproducing apparatus in accordance with the present invention is characterized in that a volume label which is recorded in the management information recorded area of the optical disc is used as the identification information.

And the identification information obtaining portion consequently uses the volume label which is contained in a file system of the optical disc as the identification information. Because a specific value is recorded in the volume label for every optical disc, the optical disc can be uniquely identified. Further, because the volume label can be obtained without performing for example reproduction of the image data that is contained in the optical disc, obtaining can be completed in a short processing time.

Further, to attain the above described object the composite reproducing apparatus in accordance with the present invention further includes an operating portion, and a command to display the identification information is output in case where an identification information display button that is included in the operating portion is pushed down, or in case where display operation of the identification information is performed in an operating screen that is displayed by a video signal superposed by the video signal superposing portion.

And the composite reproducing apparatus in accordance with the present invention consequently displays the identification information when an identification information display button that is included in an operating device (operating portion) such as a remote controller is pushed down by a user. Or the composite reproducing apparatus displays the identification information when an icon or the like for displaying the identification information is selected by a user in a menu screen or the like that is displayed by the OSD.

As above described according to the present invention, the process for obtaining the identification information is not performed after the command to display identification information of the optical disc is received, but the identification information is obtained and stored in advance, and time for the process for displaying can be shortened as a result and waiting time of a user can be reduced. Further, the identification information can be displayed without starting up the optical disc reproducing device. And it is as a result not necessary to start up the optical disc reproducing device, eject or reproduce the optical disc to confirm the title of the disc for confirming content of the disc.

Further, according to the present invention, it is possible to prevent a user from falsely recognizing the title of an optical disc because the identification information is not displayed when an optical disc is not placed on the apparatus.

Further, according to the present invention, the title of optical disc can be easily identified without performing ejecting of the optical disc. Further, waiting time of a user can be reduced because obtaining of the volume label can be performed in much shorter processing time than the process for reproducing the image or the like. Further, a user can easily and intuitively perform the display operation of the identification information.

DESCRIPTION OF THE PREFERRED EMBODIMENTS

Hereinafter, one embodiment of the present invention will be explained with reference to drawings. It should be noted that the embodiment shown here is a mere example and the present invention is not intended to be limited to the embodiment shown here.

<1. About Inner Structure>

Figure 2:
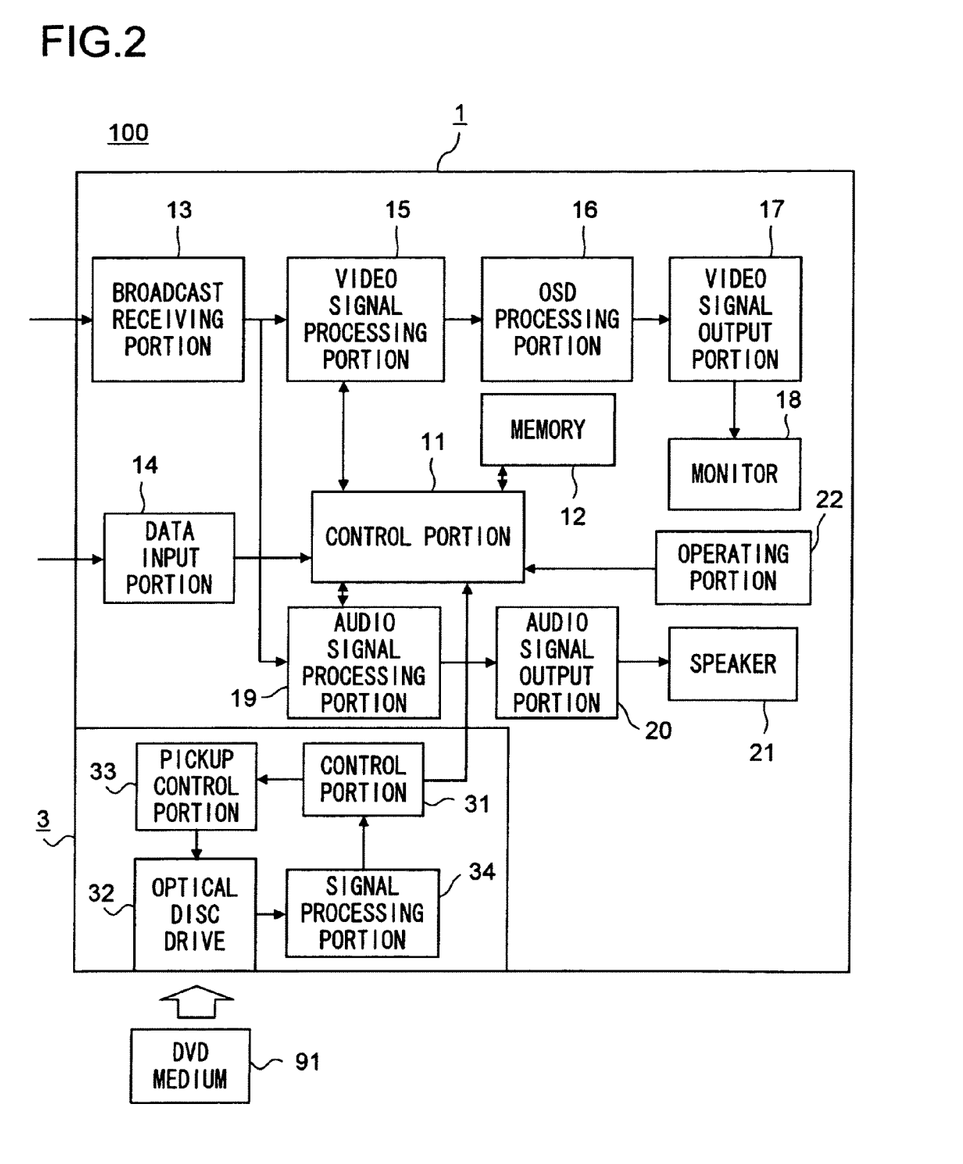
FIG. 2 is a structural diagram to show an inner structure of the composite reproducing apparatus in accordance with the present invention.

FIG. 2 is a block diagram to show a television with a built-in DVD player 100 (composite reproducing apparatus) according to one embodiment of the present invention. The television with a built-in DVD player 100 is composed of a television device portion 1 and an optical disc device portion 3. The television device portion 1 (display device) and the optical disc device portion 3 (optical disc reproducing device) are operated by voltages supplied from a common power supply (not shown), but operation of the respective devices is individually controlled by the respective control portions (a television control portion 11 and a control portion 31). And even if, for example the optical disc device portion 3 is in a stopping state, a television broadcast can be seen from the television device portion 1.

The television device portion 1 is structured to include at least a control portion 11, a memory 12 (memory portion), a broadcast receiving portion 13, a data input portion 14, a video signal processing portion 15, an OSD processing portion 16 (video signal superposing portion), a video signal output portion 17, a monitor 18 (display portion), an audio signal processing portion 19, an audio signal output portion 20, a speaker 21, and an operating portion 22. Further, the optical disc device portion 3 is structured to include at least a control portion 31, an optical disc drive 32, a pickup control portion 33, and a signal processing portion 34.

The control portion 11 controls receiving of television broadcast, a process for displaying the received television broadcast and the like in an integrated manner by controlling driving of the respective portions of the television device portion 1. The control portion 11 is composed of, for example, a plurality of microprocessors. Further, the control portion 11 is a central portion to control the respective portions, to perform data calculation and processing and the like. It should be noted that details of the respective function portions (identification information recording portion 11a—identification information erasing portion 11c in FIG. 1) which are included in the control portion 11 will be described later.

The memory 12 is a medium to temporally store various data that the television device portion 1 has, and it is composed of, for example, Random Access Memory (RAM) which is recordable. The memory 12 plays a role as a buffer memory to temporally store processing data when a process for reproducing is performed by the control portion 11, and direction or command which is received from a user and the like.

The broadcast receiving portion 13 is connected to an external antenna (not shown) to perform tuning, receiving, frequency conversion, amplification, demodulation and the like of digital broadcasting or analog broadcasting. The video signal, the audio signal, and the like are consequently obtained from the received broadcasting signal. An analog broadcast receiving portion 13 is structured to include an analog tuner, a video intermediate frequency amplifying circuit, a demodulation circuit, an amplifying circuit and the like. Or a digital broadcast receiving portion 13 is structured to include a digital tuner, an error correction portion, multiple separator and the like.

The data input portion 14 is an input interface to perform input of the video signal and the audio signal from an external device. Further, it plays a role to input digital information which is video signals or audio signals compressed by a specific compression method. The data input portion 14 is structured to include external input terminals such as an RCA input terminal, an S terminal and an HDMI terminal.

The video signal processing portion 15 compresses the video signal by a method for compressing motion picture such as MPEG2 to generate the digital information. As for the signal to be compressed, for example, the video signal which is input from the data input portion 14 is an object to be compressed. To the contrary, the video signal processing portion 15 has a function to demodulate digital broadcast data that is input from the broadcast receiving portion 13 into the video signal.

The OSD processing portion 16 generates the video signal to display a still picture such as character image and icon. To be more concrete it generates for example a video signal to display a recording reservation screen by which a user performs reservation of recording, and thumbnail pictures which is extracted from the motion picture data. The video signal which is generated by the OSD processing portion 16 is superposed on the video signal which is output from the video signal processing portion 15 and is output to the video signal output portion 17.

The video signal output portion 17 converts the video signal which is output from the OSD processing portion 16 into primary color signals. Then, the video signal output portion 17 performs display of the image on the monitor 18 utilizing the primary color signals. The video signal output portion 17 is realized by for example an integrated circuit such as LSI chip.

The monitor 18 is a display portion which is structured by, for example, a Liquid Crystal Display (LCD) module that is composed of a backlight, a liquid crystal panel, drivers and the like. The backlight is a light emitting device which is disposed at backside of the liquid crystal panel. As for the backlight, for example, an edge light method in which cold-cathode tube is utilized as a light source, or a direct backlight method in which fluorescent lamps are aligned at backside of the liquid crystal panel, is utilized. A light emission amount of light source of the backlight is adjusted by a backlight adjuster or an inverter circuit.

The audio signal processing portion 19 converts the digital signal which includes the sound that is demodulated by the broadcast receiving portion 13, and the sound that is input from the data input portion 14 into the analog signal utilizing the D/A conversion and outputs the analog signal to the audio signal output portion 20. The audio signal output portion 20 converts the audio signal into sound to output utilizing the speaker 21. At this time the audio signal output portion 20 performs setting of output level and sound quality based on the command that is received from the control portion 11.

A user performs various kinds of commands for viewing the television program and the like through the operating portion 22 to the television with a built-in DVD player 100. The command output from the operating portion 22 is received by the control portion 11. Further, the operating portion 22 is structured to include an identification information display button (not shown) for outputting a command to display identification information of the optical disc to the control portion 11.

The control portion 31 controls a process for reproducing the optical disc and the like in a integrated manner by controlling driving of the respective portions of the optical disc device portion 3. The control portion 31 is composed of, for example, a plurality of microprocessors. Further, the control portion 31 is a central portion to control the respective portions, to perform data calculation and processing, and the like. It should be noted that details of the function portions (identification information obtaining portion 31a and optical disc detecting portion 31b in FIG. 1) which are included in the control portion 31 will be described later.

The optical disc drive 32 is an optical device to perform optically reading of various kinds of data from the optical disc such as a CD medium, a DVD medium 91. It should be noted that because there are a plurality of standards for the optical discs, if an optical disc which is in conformity with the standard that corresponds to the optical disc drive 32, is not used, the respective processes (a process for reproducing and the like) cannot be performed.

The pickup control portion 33 performs control of an optical pickup (not shown) that is included in the DVD drive 32. The optical pickup irradiates a light beam to the DVD medium 91 to perform reading out the various information such as sound information, image information which are recorded in the DVD medium 91. At this time, the pickup control portion 33 performs various controls of the optical pickup such as driving control, focus control, tilt control.

The signal processing portion 34 performs demodulation of the data such as streaming data in MPEG2 method which is read out by the optical disc drive 32 from the DVD medium 91 to obtain the video signal, the audio signal, or management information. The obtained signal or various management information are output to the control portion 31 and a part of it is output to the television device portion 1.

<2. About Structure of Function Portion>

Hereinafter, relation of the respective function portions which are made to perform a process for displaying disc information in the television with a built-in DVD player 100 according to one embodiment of the present invention will be explained with reference to a function block diagram of FIG. 1.

Figure 1:
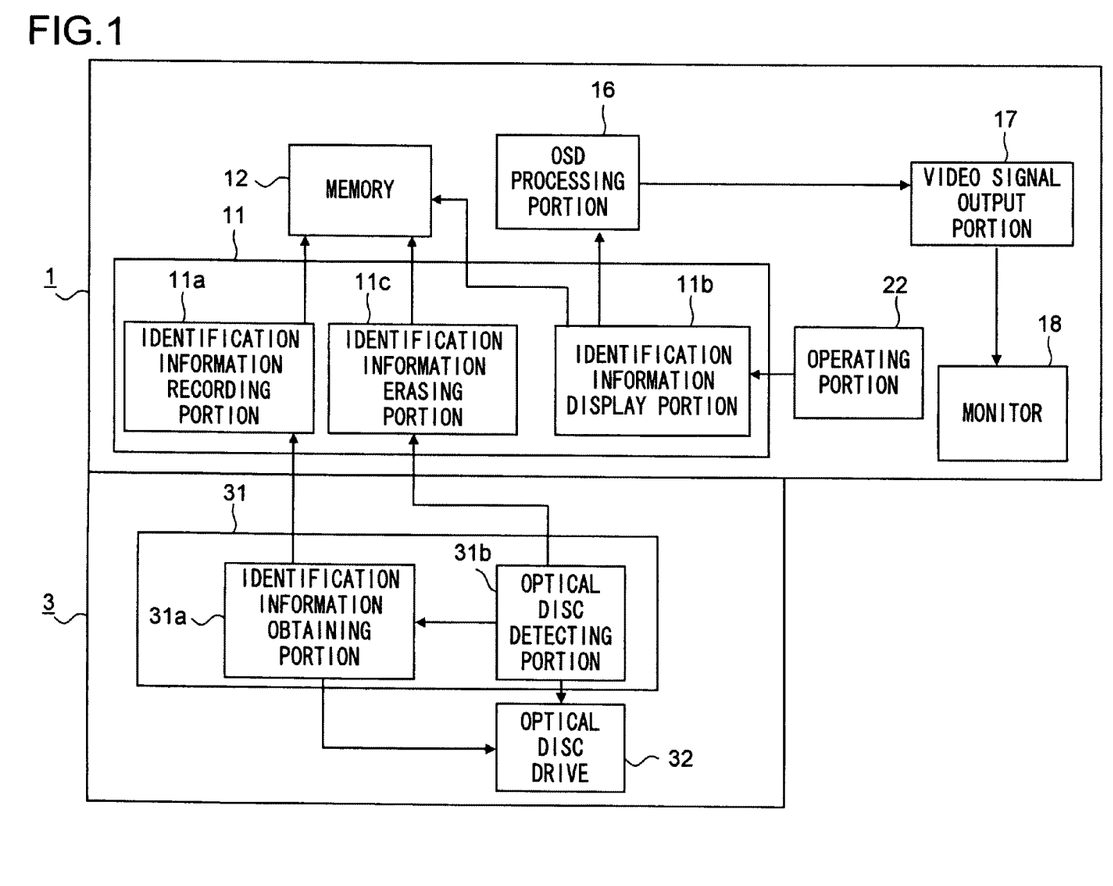
FIG. 1 is a function block diagram to show a structure of a function portion which is included in a composite reproducing apparatus in accordance with the present invention.

As shown in FIG. 1, the process for displaying disc information in accordance with the present invention is performed by at least an identification information recording portion 11a, an identification information display portion 11b, and an identification information erasing portion 11c which are included in the control portion 11, an identification information obtaining portion 31a and the optical disc detecting portion 31b which are included in the control portion 31, a memory 12, an OSD processing portion 16, a video signal output portion 17, the monitor 18, and the optical disc drive 32.

The identification information recording portion 11a stores the identification information in the memory 12 when the identification information of the optical disc (DVD medium 91 in FIG. 2 or the like) is input into the identification information recording portion 11a from the identification information obtaining portion 31a which will be described later. It should be noted that kind of the identification information of optical disc is not especially limited as far as it is information that can uniquely identify an optical disc. However, in the present embodiment a volume label that is included in a file system of the optical disc, is utilized as the identification information. And the identification information recording portion 11a stores as a result the volume label which is output from the identification information obtaining portion 31a in the memory 12.

The identification information display portion 11b reads out the volume label of optical disc which is stored in the memory 12 and displays it on the monitor 18 utilizing the OSD processing portion 16 when the identification information display portion 11b receives a command to display the identification information of the optical disc by user operation utilizing the operating portion 22.

The identification information erasing portion 11c erases the volume label of optical disc which is stored in the memory 12 when it receives notice that the optical disc is ejected from the optical disc drive 32 from the optical disc detecting portion 31b which will be described later.

The identification information obtaining portion 31a reads out the file system from a management information recording area of the optical disc when it receives notice that the optical disc is inserted on the optical disc drive 32 from the optical disc detecting portion 31b which will be described later. Then, the identification information obtaining portion 31a obtains the volume label which is included in the file system and outputs it to the identification information recording portion 11a.

The optical disc detecting portion 31b monitors a state of the optical disc drive 32. Then, the optical disc detecting portion 31b outputs a notice of detected inserting to the identification information obtaining portion 31a when it detects inserting of the optical disc on the optical disc drive 32. Further, the optical disc detecting portion 31b outputs a notice of detected ejecting to the identification information erasing portion 11c when it detects ejecting of the optical disc from the optical disc drive 32.

<3. About Identification Information Display Screen>

Hereinafter, one example of an identification information display screen in the television with a built-in DVD player 100 according to one embodiment of the present invention will be explained with reference to screen diagram of FIG. 3. It should be noted that the identification information display screen shown here is displayed, for example, in case where display of disc information is selected in a menu screen (operating screen) which is displayed by the OSD processing portion 16, or in case where an identification information display button which is included in the operating portion 22 is pushed down or the like.

Figure 3:
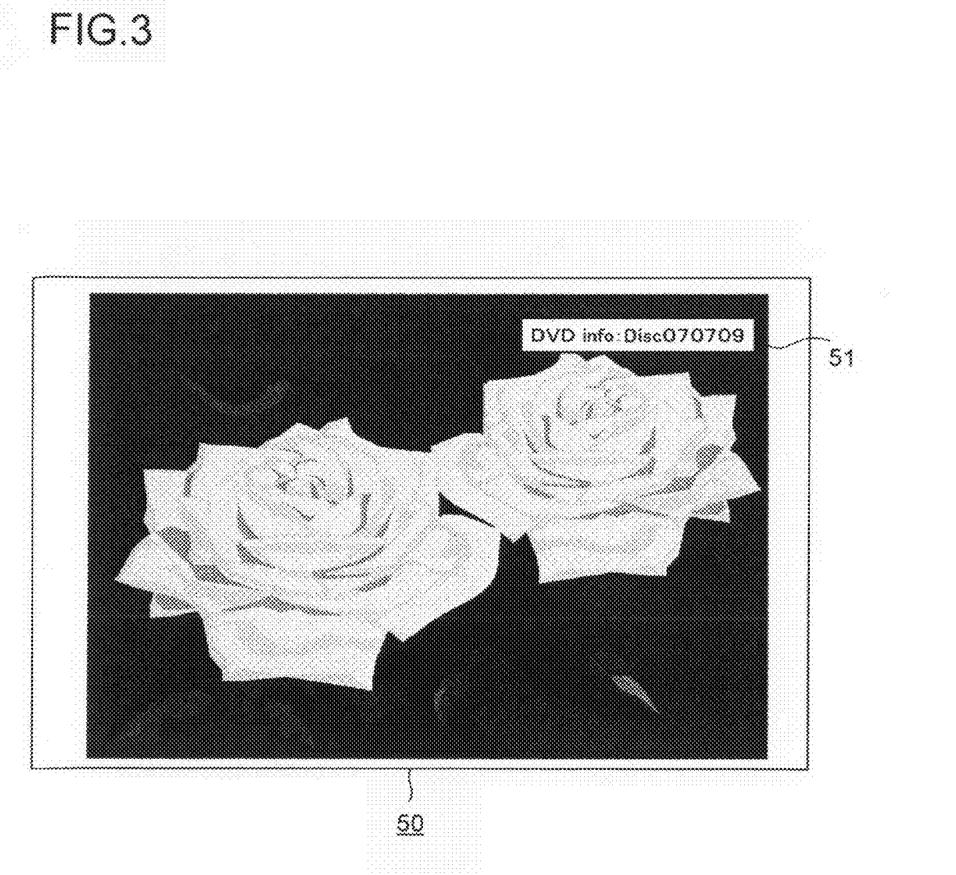
FIG. 3 is a screen diagram to show one example of an identification information display screen in accordance with the present invention.

As shown in FIG. 3, the identification information display screen 50 which is displayed in the television with a built-in DVD player 100 in accordance with the present invention is structured to include at least an identification information display area 51. It should be noted that the OSD processing portion 16 may display character information for a title and reproducing time of the reproduced program, an operating menu and the like other than the items shown in FIG. 3.

The identification information display area 51 is an area to display the volume label which is read out from the memory 12 by the identification information display portion 11b, and it can be displayed in an arbitrary position of the identification information display screen 50. In the example shown in FIG. 3 a character string "Disk070709" is displayed as the volume label. It should be noted that the present invention may be applied to an embodiment in which display position or size of the identification information display area 51 can be altered by a user utilizing the operating portion 22. It should be noted that the identification information display area 51 is erased from the screen in case where a prescribed time elapses from beginning of the display, or in case where specific user operation is received or the like.

<4. About a Process for Obtaining Identification Information>

Hereinafter, an explanation will be given about an process for obtaining the identification information of the optical disc in the television with a built-in DVD player 100 according to one embodiment of the present invention with reference to the block diagrams of FIG. 1 and FIG. 2, and a flow diagram of FIG. 4.

Figure 4:
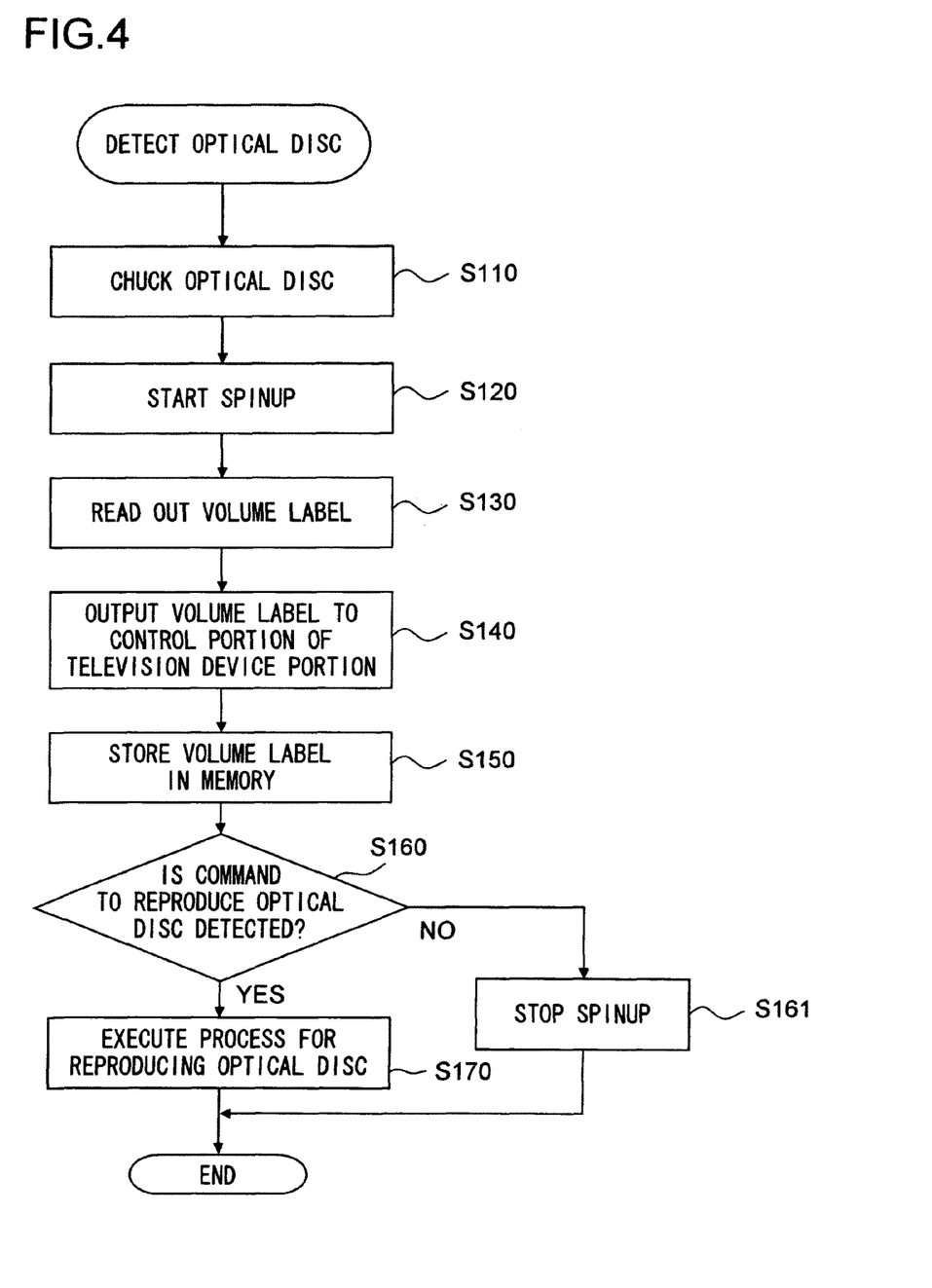
FIG. 4 is a flow diagram to show a process for obtaining identification information in accordance with the present invention.

FIG. 4 is a flow chart to show a flow of the process for obtaining the identification information according to one embodiment of the present invention. This process is started when the optical disc detecting portion 31b detects that a DVD medium 91 is inserted on the optical disc drive 32.

The optical disc detecting portion 31b detects inserting of the DVD medium 91 then outputs the notice of detected inserting to the identification information obtaining portion 31a and the pickup control portion 33. At the same time, the optical disc drive 32 performs a chucking process in which the DVD medium 91 is put on a driving member which is driven by a spindle motor in step S110.

In step S120, the optical disc drive 32 starts a process of spinup for driving the optical disc to rotate. When the process of spinup is started, the pickup control portion 33 performs focus control and tracking control of the optical pickup and the like to make it possible to read out information from a recording surface of the DVD medium 91 (accessible state).

After the accessible state is made, the identification information obtaining portion 31a reads the volume label from an area where a management information of the DVD medium 91 is recorded (management information recorded area) in step S130. Then, in step S140, the identification information obtaining portion 31a outputs the read volume label to the identification information recording portion 11a.

The identification information recording portion 11a receives the volume label then stores the volume label in the memory 12 in step S150. Next, the control portion 31 performs judgment whether it detects a command to reproduce the DVD medium 91, or not. It should be noted that the reproducing command is output in case where a reproducing button which is included in the operating portion 22 is pushed down by a user or the like.

When the reproducing command is detected, the process for reproducing the DVD medium 91 is performed utilizing the pickup control portion 33, the signal processing portion 34, the video signal output portion 17, the monitor 18 and the like in step S170. To the contrary, if the reproducing command is not detected within a prescribed time, the optical disc drive 32 stops the process of spinup in step S161. And the accessible state is temporarily released as a result then the whole process is terminated.

<5. About Process for Displaying Identification Information>

Hereinafter, an explanation will be given about a process for displaying the identification information of the optical disc in the television with a built-in DVD player 100 according to one embodiment of the present invention with reference to the block diagrams of FIG. 1 and FIG. 2, the screen diagram of FIG. 3, and the flow diagram of FIG. 5.

Figure 5:
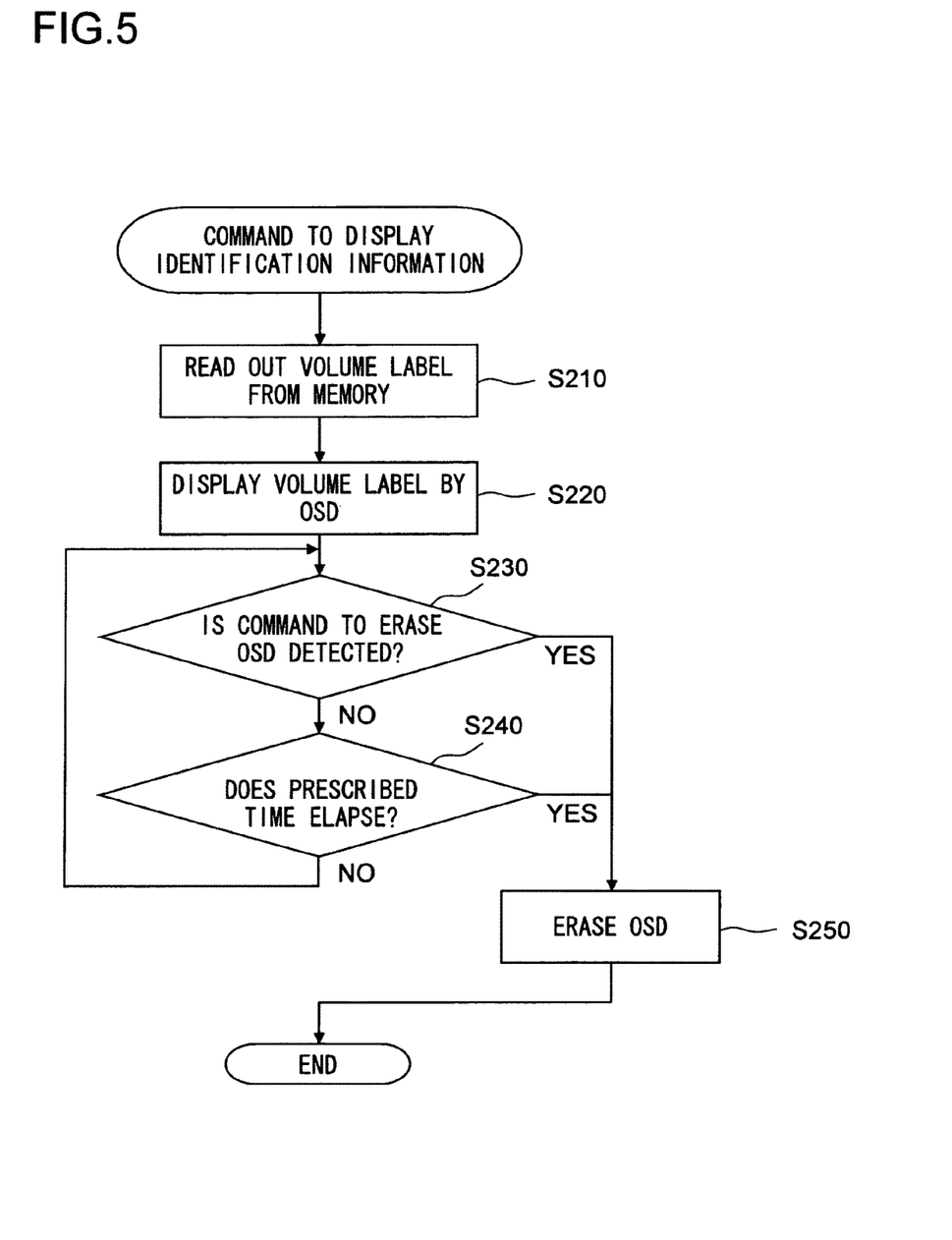
FIG. 5 is a flow diagram to show a process for displaying identification information in accordance with the present invention.

FIG. 5 is a flowchart to show a flow of the process for displaying the identification information according to one embodiment of the present invention. This process is started when the identification information display portion 11b detects a command to display identification information the DVD medium 91. The command to display identification information is output, for example, in case where an icon which shows execution of the identification information display is selected in the menu screen that is displayed by the OSD processing portion 16, in case where an identification information display button which in included in the operating portion 22 is pushed down or the like.

The identification information display portion 11b receives the command to display identification information then performs reading out of the volume label from the memory 12 in step S210. It should be noted that in case where the volume label is not stored in the memory 12, it is preferable that an error message or a character image which means that the optical disc is not inserted yet is generated by the OSD processing portion 16 and displayed on the monitor 18.

Next, the identification information display portion 11b makes the OSD processing portion to generate a character image that means the volume label which is read out and displays it on the monitor 18 in step S220. The identification information display area 51, for example, is consequently displayed as shown in FIG. 3 and the character image that means the volume label is displayed in the area.

Next, the identification information display portion 11b performs judgment whether a command to erase the identification information display area 51 is detected or not in step S230. It should be noted that this erasing command is output, for example, in case where the identification information display button that is described above is pushed down or the like in the state where the identification information display area 51 is displayed. Or, the present invention may be applied to an embodiment in which the identification information erase button to output the erasing command is included in the operating portion 22.

In case where it is judged that the erasing command is detected, the identification information display portion 11b stops the process for displaying in the identification information display area 51 by the OSD processing portion 16 in step S250, and the whole process is terminated. In case where it is judged that the erasing command is not detected, the identification information display portion 11b performs judgment whether a prescribed time elapses or not after start of the display of the identification information display area 51 by the OSD processing portion 16 in step S240.

In case where it is judged that the prescribed time does not elapse, the flow returns to step S230 again. In case where it is judged that the prescribed time elapses, the flow moves to step S250 and the process for displaying the identification information in the display area 51 by the OSD processing portion 16 is stopped and the whole process is terminated.

<6. About Process for Erasing Identification Information>

Hereinafter an explanation will be given about a process for erasing an identification information of the optical disc in the television with a built-in DVD player 100 according to one embodiment of the present invention with reference to the block diagrams of FIG. 1 and FIG. 2, and the flow diagram of FIG. 6.

Figure 6:
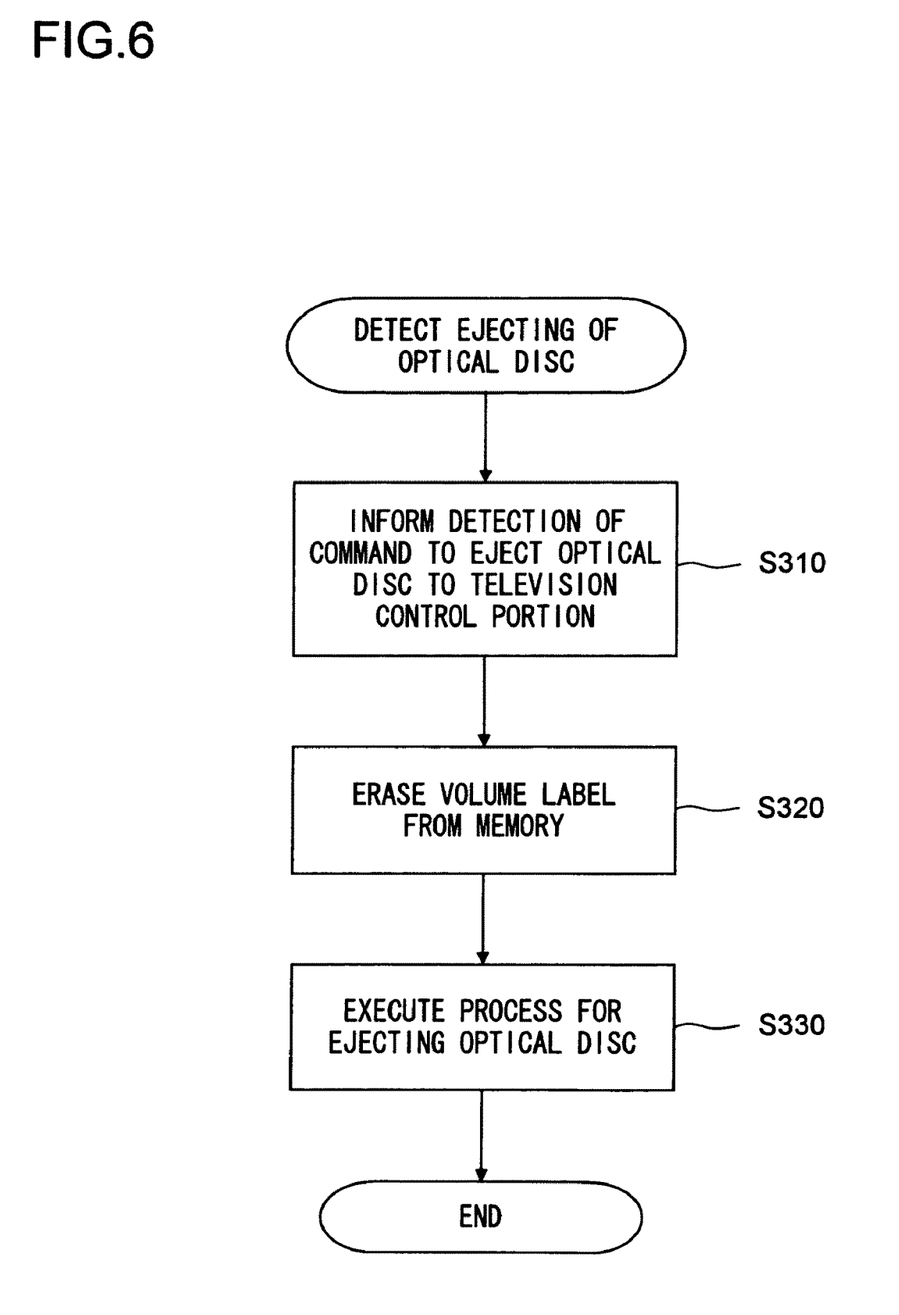
FIG. 6 is a flow diagram to show a process for erasing identification information in accordance with the present invention.

FIG. 6 is a flowchart to show a flow of the process for erasing the identification information according to one embodiment of the present invention. This process is started when an optical disc detecting portion 31b detects a command to eject the DVD medium 91 from the optical disc drive 32. It should be noted that the ejecting command is output, for example, in case where an optical disc eject button that is included in the operating portion 22 is pushed down or the like.

The optical disc detecting portion 31b detects the command to eject the DVD medium 91 then outputs notice of detected ejecting to the identification information erasing portion 11c in step S310. The identification information erasing portion 11c receives the notice of detected ejecting then performs erasure of the identification information, that is, the volume label which is stored in the memory 12 in step S320.

Next, the optical disc drive 32 performs a process for ejecting the optical disc in step S330 and terminates the whole process. It should be noted that because the process for ejecting the optical disc is quite the same as the conventional technology, explanation on it is omitted here.

Other Embodiments

As above described, the present invention has been explained by way of preferred embodiment and examples. The present invention is not necessarily limited to the above described embodiment and the present invention may be applied with various modifications without departing scope and spirit of the present invention.

And the present invention may be applied as a result to embodiments described below.

(A) In the above described embodiment, various function portions that relate to the process for obtaining the identification information, the process for displaying the identification information, and the process for erasing the identification information are realized by programs executed by a calculation processing unit such as a microprocessor, however, the present invention may be applied to an embodiment in which the respective function portions are realized by a plurality of circuits.

(B) In the above described embodiment, the television with a built-in DVD player 100 is explained as an example of the composite reproducing apparatus, however, the process for displaying the identification information in accordance with the present invention can be performed in other apparatus as far as the apparatus is a composite apparatus which is provided with the optical disc reproducing device. The present invention may be applied to an embodiment, for example, a television with a built-in BD player, a composite apparatus of DVD/VCR/television, and the like.

(C) In the above described embodiment, the volume label is used as the identification information to uniquely identify the optical disc, however, the present invention may be applied to an embodiment in which data other than the volume label is used as the identification information. Further, the present invention may be applied to an embodiment in which information other than the identification information, for example, kind of the disc, recorded data size, a finalized date, or the like is obtained as additional data and it is added to the identification information to be stored and displayed. Consequently there is an effect that it becomes easier for user to identify content of the optical disc.

What is claimed is:

1. A composite reproducing apparatus comprising:
    a display device which comprises a memory portion, a display portion, and a video signal superposing portion that performs superposition of video signals; and
    an optical disc reproducing device which comprises an optical disc drive,
    the apparatus being able to control start and stop of the display device and the optical disc reproducing device respectively, wherein
    the optical disc reproducing device further comprises:
    an optical disc detecting portion which detects inserting and ejecting of the optical disc on/from the optical disc drive; and
    an identification information obtaining portion which obtains identification information to identify the optical disc from a management information recorded area of the optical disc and outputs it to the display device when inserting of the optical disc is detected by the optical disc detecting portion, and
    the display device further comprises:
    an identification information recording portion which stores the identification information that is output from the identification information obtaining portion in the memory portion; and
    an identification information display portion which reads out the identification information from the memory portion when the identification information display portion receives a command to display the identification information, and sends a video signal including the identification information that is superposed by the video signal superposing portion to the display portion,
    identification information obtaining portion obtains an identification name, disc kind, recorded data size, or finalized date of the optical disc from the optical disc, and feeds it, in a form included in the identification information, to the display device, and
    on detecting a command to display the identification information, the identification information display portion, irrespective of whether or not the optical disc is in an accessible state, inhibits the identification information obtaining portion from obtaining the identification information, and reads out the identification information from the recording portion and displays it on the display portion.

2. The composite reproducing apparatus according to claim 1, wherein the display device further comprises an identification information erasing portion which erases the identification information that is stored in the memory portion when ejecting of the optical disc is detected by the optical disc detecting portion.

3. The composite reproducing apparatus according to claim 1, wherein a volume label which is recorded in the management information recorded area of the optical disc is used as the identification information.

4. The composite reproducing apparatus according to claim 1 further comprises an operating portion, wherein the command to display the identification information is output in case where an identification information display button that is included in the operating portion is pushed down, or in case where display operation of the identification information is performed in an operating screen that is displayed by a video signal superposed by the video signal superposing portion.

* * * * *